United States Patent [19]

Houser

[11] Patent Number: 4,543,246

[45] Date of Patent: Sep. 24, 1985

[54] HYDROGEN GENERATOR

[76] Inventor: Clifford F. Houser, Flint, Mich.

[21] Appl. No.: 657,508

[22] Filed: Oct. 4, 1984

[51] Int. Cl.[4] .............................................. C01B 13/00
[52] U.S. Cl. .................... 423/648 R; 422/62; 422/233; 423/659
[58] Field of Search .................. 423/648 R, 659, 657; 422/62, 109, 233, 235

[56] References Cited

U.S. PATENT DOCUMENTS

| | | | |
|---|---|---|---|
| 2,045,429 | 6/1936 | Willshaw et al. | 423/233 |
| 3,313,598 | 4/1967 | Gluckstein | 423/657 |
| 3,392,003 | 7/1968 | Partridge et al. | 422/233 |
| 3,707,355 | 12/1972 | Anderson | 422/233 |
| 4,215,201 | 7/1980 | Cerroni | 422/233 |
| 4,288,410 | 9/1981 | Weber et al. | 422/233 |
| 4,325,355 | 4/1982 | Houser | 126/263 |

*Primary Examiner*—John Doll
*Assistant Examiner*—Wayne A. Langel
*Attorney, Agent, or Firm*—Fisher, Crampton, Groh & McGuire

[57] ABSTRACT

A gas generator in which the gas is produced by a reaction between a solid metal and a liquid reactant. The generator is operated to produce hydrogen intended as an energy source particularly for operating internal combustion engines. A solid reactant is reacted with a liquid reactant under conditions in which both reactants are moving and continuously maintained under operating conditions. The solid is in the form of metal balls which are conveyed through a reaction chamber on inclined perforate channels. The liquid reactant is sprayed over the moving balls. Waste solid reaction products are removed by the rolling action of the balls on the perforate channels and the washing action of the sprayed liquid reactant. In the production of hydrogen, aluminum metal balls are used and the liquid reactant is a solution of sodium hydroxide. Because the reaction is exothermic, excess heat is removed by cooling the liquid reactant.

12 Claims, 1 Drawing Figure

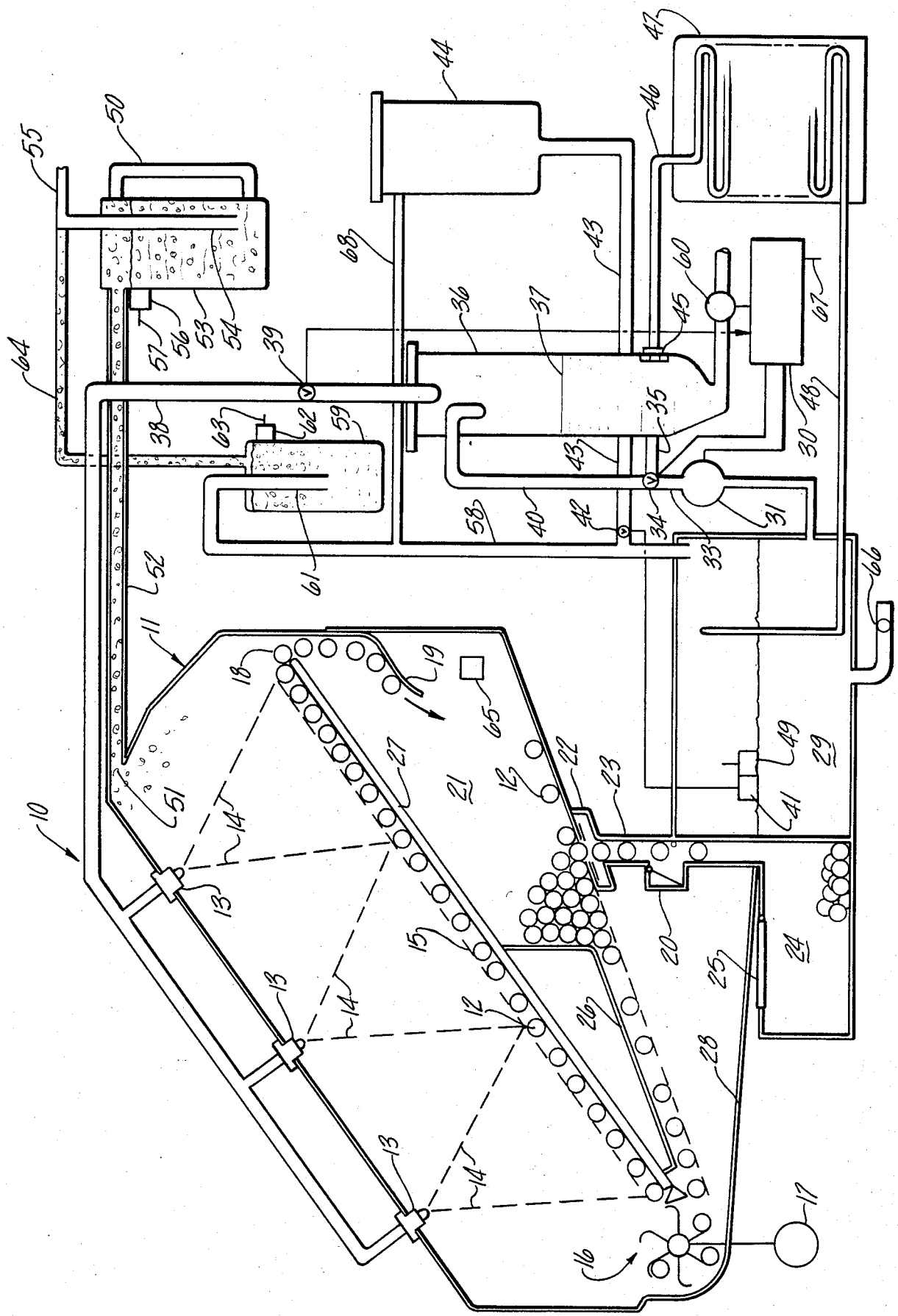

HYDROGEN GENERATOR

BACKGROUND OF THE INVENTION (1) Field of the Invention

The subject invention relates to the gas generator field, and, more particularly, to the generation of hydrogen as an energy source in an enviroment where the total output of a given generator is dedicated to a single use such as supplying the energy for an internal combustion engine.

(2) Description of the Prior Art

Gas generators can take many forms generally envolving a chemical reaction, a liquification-separation process or an electrolysis reaction. In the case of hydrogen production, most of the gas is manufactured from natural gas, which is mainly methane, $CH_4$. Refinery gas which is produced during oil refining and is a mixture of methane, propane and butane, can also be used for hydrogen production. These gases are reacted with steam at elevated temperature in the presence of a catalyst to produce hydrogen and carbon monoxide. Carbon monoxide is usually reacted to carbon dioxide and then separated by an absorption process. This multi-step process envolves complex high temperature equipment. The other main means of producing hydrogen is by electrosis of water into its component oxygen and hydrogen gases; this envolves large equipment and a source of cheap electricity. Other processes envolve high temperature reactions such as partial combustion under carefully controlled conditions; all these processes result in gas mixtures from which the hydrogen must be separated.

On a smaller scale, U.S. Pat. No. 3,975,913 teaches a method of producing hydrogen by the reaction of a liquid metal with a gas, such as liquid aluminum and steam at a temperature of 1400° F.

In my own U.S. Pat. No. 4,325,355, I have set forth a heating system utilizing an exothermic reaction of a solid metal, preferably aluminum, and a solution, preferably containing the reactant sodium hydroxide. The exothermic heat releases is indirectly transferred for conventional space heating. A bi-product of this heating system is the production of hydrogen.

It is a object of this invention to utilize a simple low temperature, flameless chemical reaction such as taught in U.S. Pat. No. 4,325,355 to produce hydrogen gas.

It is also an object of this invention to provide a method and apparatus for continously producing hydrogen to be used as the fuel source of an internal combustion engine, thus requiring a compact, portable gas generator.

Another object is the production of hydrogen gas from readily available reactants.

BRIEF SUMMARY OF THE INVENTION

The instant invention is directed to a method and apparatus for producing a gas continuously by the reaction of a solid material with a liquid in a low temperature, low pressure environment with compact and portable means.

The generator utilizes a supply of balls made from the solid reactant material. These balls are circulated through a reaction chamber by rolling them up inclined perforate channels. These channels can take the form of screen mesh tubing. The liquid reactant material is sprayed from a plurality of spray nozzles downwardly on the ascending balls. The waste solid reaction products are removed from the reacting balls by the rolling action of the balls against the perforate channels and the washing action of the sprayed liquid reactant which passes through and down the perforate channels by gravity and is led out the reaction chamber. The liquid reactant is led back to a sump from whence it pumped through a sediment filter to remove the solid waste reaction product and then back to the spray nozzles in the reaction chamber. The concentration of the liquid reactant is controlled from a sensor in the liquid sump which controls the addition of concentrated make up solution. The temperature of the liquid reactant is also maintained from a sensor in the liquid sump or a themostatic valve in the sentiment filter which allows the liquid to flow through an indirect heat exchanger. The balls exit from the reaction chamber by gravity into a supply receiver. The balls are fed by gravity to the entrance end of the reaction chamber where pawl and ratchet wheel means introduces the balls, one at a time, to the channels. When the balls have eroded to a minimum size by the chemical reaction, they are ejected from their flow path by falling through a gauge slot into a spent ball receiver. The generated gas is delivered from the reaction chamber by its own back pressure built up in a flash-back preventor/gas washer unit in the gas outlet line.

The method of producing the gas from a reaction of a solid reactant and a liquid reactant envolves supplying the solid reactant in the form of balls to a continuous flow path. The balls are sprayed with liquid reactant to release the gas. The liquid reactant also serves to carry away waste solid reaction products. The liquid reactant is collected after being sprayed and is circulated in a closed flow path in which heat exchange takes place to control temperature and filtration takes place to remove the waste solid reaction products. Concentrated liquid reactant is added to the liquid flow path to control concentration.

In the preferred form of the invention, hydrogen is produced by the exothermic reaction of aluminum and a solution of sodium hydroxide. Heat exchange with reactant liquid must remove excess heat to control temperature.

THE DRAWING

The single FIGURE drawing is a diagrammatic view showing a gas generator embracing the preferred embodiment of the invention.

DETAILED DESCRIPTION OF THE PREFERRED EMBODIMENT OF THE INVENTION

Referring to the drawing, the gas generator shown generally at 10 includes reaction chamber 11 in which a chemical reaction takes place between a solid reactant in the form of balls 12 and a liquid reactant sprayed from nozzles 13 in a spray pattern 14 to cover balls 12 as they travel upwardly through chamber 11 in a plurality of side by side inclined perforate channels 15 which may take the form of screen mesh tubes. The balls 12 are fed into perforate channels one at a time by pawl and ratchet wheel ball feeder 16 driven by reduction motor 17. The balls exit from the reaction chamber 11 through opening 18 and travel by gravity along ball return guide 19 into and through ball receiver chamber 21. New balls are loaded into receiver chamber 21 as needed. As the balls are circulated through the system they decrease in size due to the erosion accompanying the chemical reaction. When the balls have been reduced in diameter to a certain point they become less effective than desired. In the preferred embodiment where hydrogen gas is being generated, the balls 12 are made from aluminum metal and they are supplied to chamber 21 with a one inch diameter. When the balls have been eroded to a ¾" diameter they are not effective enough, having had their surface area reduced by over 40%, and they are difficult to handle by ball feeder 16. In order to remove undersized balls automatically a ball slot gauge 22 is located in the path of the balls travelling through the chamber 21. The gauge 22 can be set at any desired size to allow the undersized balls to pass therethrough. The undersized balls drop by gravity through slot 22, chute 23 and into spent ball receiver 24. The undersized balls can be retreived from receiver 24 by opening removable cover 25. In order for to preserve the gas atmosphere of the gas being produced in the chamber 11 throughout the system, including ball receiver chamber 21, flapper valve 20 located in chute 23 is closed when balls are being removed from spent ball receiver 24. Balls 15 travel in their continuous path from receiver chamber 21 to ball feeder 16 by gravity through passage 26.

The liquid reactant as well as the solid reactant in the form of balls 12 is also circulated in a continuous path. In the preferred embodiment where hydrogen is being generated and the solid reactant balls are aluminum, the preferred liquid reactant is a solution of sodium hydroxide, and the waste product is sodium aluminate. As mentioned above, the liquid reactant is sprayed downwardly from nozzles 13 in a spray pattern 14 to cover the balls ascending through the chamber 11. The waste solid reaction products are removed from balls 12 by the rolling action of the balls against the perforate channel 15. In the preferred embodiment, where the new aluminum balls have a 1 inch diameter, the perforate channel can take the form of a screen mesh tube of 1⅛" diameter which will provide a good cleaning action against the balls bing rolled and pushed against each other through the inclined screen tube. The washing action of the sprayed liquid reactant will remove the waste solid product, which is in the form of a sediment, from balls 12 and the surface of perforate tube or channels 15. The liquid reactant will travel by gravity from inclined surface 27, down return drain ramp 28 into sump 29 which is a reservoir of liquid reactant. Drain ramp 28 is below ball feeder 16 so that the balls 12 will not be immersed in the liquid reactant in their return travel, exiting from reaction chamber 11, through ball opening 18, down ball return guide 19, through ball receiver chamber 21, passage 26 to the ball feeder 16. The liquid reactant or solution is pumped by pump 31 from sump 29 through passage 32, pump 31, passage 33, two way valve 34 and passage 35 into sediment filter 36. The sediment in the solution is removed by filter elements 37. The solution is pumped from filter 36 through pipe 38 containing flow responsive element 39, to spray nozzles 13. When the gas flow through pipe 38 drops, as sensed by flow responsive element 39, it indicates that sediment filter elements need to be cleaned. Master controller 30 automatically actuates two way valve 34 to direct the flow of reactant solution through passage 40 to the top of filter 36. Master controller 30 also opens drain valve 60 allowing solution to flow downward through filter elements 37 flushing the sediment out and through valve 60 to a receiver, not shown. The system will continue to operate during this back flush. Sediment can also be manually drawn off from the bottom of sump 29 by opening drain valve 66. The concentration of the liquid reactant solution is maintained by a measurement of concentration in sump 29 by control 41. Concentration control 41 can utilize a liquid level sensing element or a specific gravity measuring device which acts to open or close valve 42 in line 43 to add concentrated solution from make-up tank 44 to sump 29. Optionally, concentration control 41 could use a specific gravity sensing element to control the flow of concentrated solution from make-up tank 44, and also a liquid level sensing element to control the addition of water to sump 29 from a water inlet, not shown.

For optimum operating conditions, the temperature of the liquid reactant is controlled In the preferred embodiment, producing hydrogen by the reaction of aluminum with sodium hydroxide, the reaction is exothermic so that heat must be continually removed. For optimum reaction the reactant solution should be maintained between 140°-160° F. this temperature control can be accomplished by passing a portion of the solution being circulated by pump 31 from the sediment filter 36, through thermostat valve 45, line 46, air cooled radiator 47, return line 48 to sump 29. Simple themostat valve 45 serves to measure the solution temperature and serves as an on-off valve to pass the liquid through the radiator 47 only when it needs cooling. The air cooled radiator 47 is a simple indirect heat exchanger, and, in the preferred application of generating hydrogen gas for operating an automotive internal combustion engine, a radiator is ideal. A temperature sensor 49 can be used alternatively to actuate cooling valve 45 or it can serve to actuate a high temperature warning.

The gas generated by the reaction collects in reaction chamber 11 which acts as a surge tank, when hydrogen is being generated, it naturally rises to the top of the chamber, being 16 times lighter than air. The gas outlet 51 from reaction chamber 11 is located at the peak of the chamber leading into delivery tube 52 through which the gas passes to liquid filled vessel 53 which serves as a back flash preventer in sealing the generated gas from atmosphere, and it serves as a gas washer. The gas enters the top space of vessel 53 and bubbles through the liquid contained in the vessel to the bottom of outlet tube 54 through which it passes to use outlet 55. Level controller 56 serves to maintain a constant liquid level in vessel 53 by admitting make-up liquid from line 57. The liquid used in vessel 53 is water based, its composition depending upon the gas being generated. In most cases where hydrogen is being generated the liquid can be plain water. The immersed length of outlet tube 54 establishes the back pressure in the entire system. An immersed length of 5" maintained by level controller 56 in the preferred hydrogen generator embodiment. The back pressure would be 5"w.c. Sight glass 50 is provided on the side of vessel 53 to permit visual observation of liquid level. When the generator is started, it is necessary to purge the system of air. This is facilitated by the use of vent tube 58 which extends into sump vessel 29 which is the lowest point in the system. Vent tube 58 extends from sump chamber 29 into liquid filled vessel 59, which, like vessel 53, serves as a back flash preventer and a gas washer. The gas exits from the bottom of the drop tube portion 61 of vent tube 58 and bubbles through the liquid to the top of the vessel. Level controller 62 serves to maintain a constant liquid level in vessel 59 by admitting make-up liquid from line 63. The immersed length of drop tube 61 is less than the immersed length of tube 54 in vessel 53 allowing the back pressure established by vessel 53 to force the air out through vent tube 58, vessel 59 and tube 64 to gas use outlet 55. Vent tube 68 is used to supply gas to the top of make-up tank 44 as concentrated solution is drawn off to add to sump 29. Serving a similiar function, is vacuum breaker 65 located in ball receiving chamber 21 which is used to relieve vacuum by the cooling effect of balls 12 cooling as they pass through chamber 21 and back to ball feeder 16. The rate of gas production can be controlled by the rate of reactant solution flow delivered by pump 31 in response to a demand signal delivered by line 67 to master controller 30.

The embodiments of the invention in which an exclusive property or privilege is claimed are defined as follows:

1. A gas generator for continuously producing a gas by the reaction of a solid and a liquid reactant. comprising, in combination:
   a supply of balls made from a solid reactant material;
   a reaction chamber;
   means for conveying said balls from said supply through said reaction chamber and back to said supply;
   spray means within said reaction chamber for directing a spray of liquid reactant on to said balls passing therethrough;
   means for delivering said liquid reactant from a sump, through said spray means and into contact with said balls and back to said sump; and
   means for delivering gas generated by the contact of said liquid reactant and said solid reactant balls from said reaction chamber.

2. The gas generator of claim 1 wherein said means for conveying the balls through the reaction chamber includes an inclined surface within said chamber; and further including:
   means for introducing the balls one at a time to said inclined surface in a manner such that the balls are conveyed up said inclined surface by pushing against one another.

3. The gas generator of claim 2 wherein said inclined surface comprises a plurality of channels in which the balls are conveyed in single rows and the conveying means includes a pawl and rachet wheel means to introduce the balls one at a time to said chamber.

4. The gas generator of claim 3 wherein said channels are made from perforate material so as to facilitate the flow of liquid reactant away from said balls for return to said pump along with solid products of reaction which can be removed from said balls by rolling contact with said perforate channels.

5. The gas generator of claim 4 wherein said channels are made in the form of screen mesh tubing.

6. The gas generator of claim 1 further comprising: means for removing said balls from said conveying means when the balls become undersized due to the continuing reaction.

7. The gas generator of claim 1 comprising: control means for maintaining the concentration of said liquid reactant.

8. The gas generator of claim 1 further comprising: control means for maintaining the temperature of said liquid reactant.

9. The gas generator of claim 1 wherein the the solid reactant balls are made of aluminum.

10. The method of producing a gas by the exothermic reaction of a solid and liquid reactant wherein the solid reactant is in the form of balls, comprising the following steps, in combination:
    causing the balls to move in a continuous flow path;
    spraying the balls with said liquid reactant over a portion of said flow path;
    removing the gas formed by the reaction of said liquid reactant with the solid reactant balls;
    controlling the temperature by removing the excess heat generated from the exothermic reaction by heat exchange to said liquid reactant;
    removing solid products of reaction formed by said reaction, at least in part, by filtration of said liquid reactant.

11. The method of producing gas according to claim 10 wherin the solid reactant balls are aluminum, the liquid reactant includes sodium hydroxide and the solid products of reaction include sodium aluminate.

12. The method of producing a gas according to claim 10 wherein the rate of gas production is controlled by the rate at which the liquid reactant is sprayed on said balls of solid reactant.

* * * * *